Feb. 26, 1957   J. M. STOUT   2,783,451
FOR HIRE SIGNAL FOR TAXI CABS
Filed Jan. 30, 1956
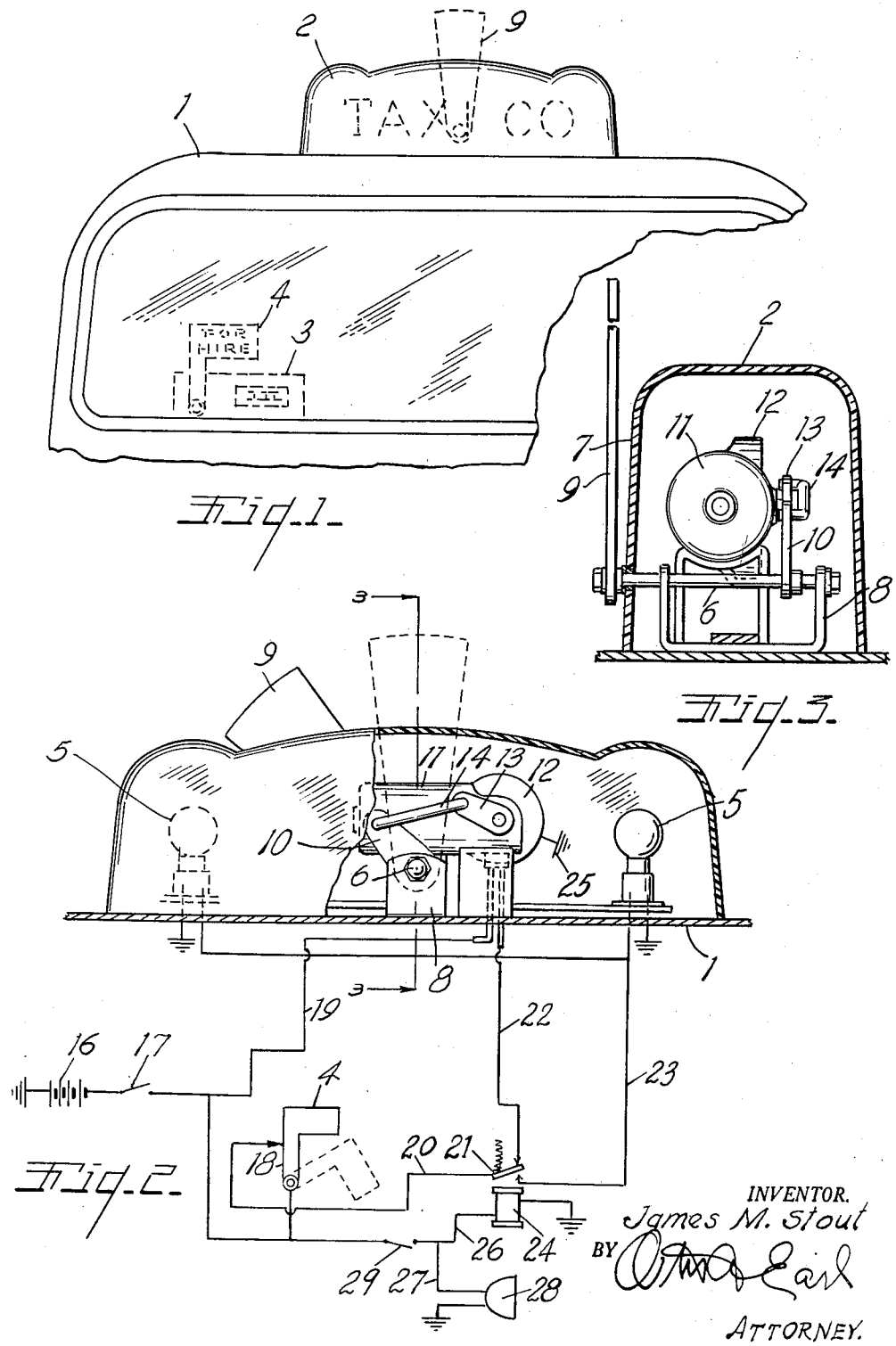
INVENTOR.
James M. Stout
BY
ATTORNEY.

2,783,451

FOR HIRE SIGNAL FOR TAXI CABS

James M. Stout, Kalamazoo, Mich., assignor to Checker Cab Manufacturing Corporation, Kalamazoo, Mich.

Application January 30, 1956, Serial No. 562,100

3 Claims. (Cl. 340—68)

This invention relates to improvements in for hire signal for taxi cabs.

The principal objects of this invention are:

First, to provide a signal which will be clearly visible in the day time for indicating the empty and for hire status of a taxi cab.

Second, to provide a taxi cab signal in which an oscillating semaphore arm driven by a motor in a roof lamp housing is energized alternatively with the roof lamp to clearly call attention to and indicate the condition of the signal in day time or nighttime.

Third, to provide a for hire signal for taxi cabs which functions automatically with the operation of the meter lever of the taxi meter and which is automatically adjusted for day or night operation.

Other objects and advantages of the invention will be apparent from a consideration of the following description and claims. The drawings, of which there is one sheet, illustrate a highly practical form of the signal as applied to taxi cabs.

Fig. 1 is a fragmentary front elevational view of the upper portion and top of a taxi cab with a for hire signal embodying the invention mounted therein.

Fig. 2 is an enlarged fragmentary elevational view of the signal partially broken away in vertical cross section and with the electrical wiring connection for the signal conventionally illustrated.

Fig. 3 is a fragmentary tranverse vertical cross sectional view taken along the plane of the line 3—3 in Fig. 2.

It is currently common practice for taxi cabs and similar public vehicles to carry a roof mounted light enclosed in a translucent dome which may bear the name of the taxi company. During the night time the driver of the taxi turns on the roof light to illuminate the dome and indicate the empty and for hire status of the taxi. Perspective passengers are thereby advised that the particular taxi is available and will stop to pick up passengers. While these roof lights are satisfactory in the night time, the light in the dome is insufficient to indicate the status of the taxi during the day time when external daylight renders the dome light invisible. The present invention provides an oscillating semaphore signal that is clearly visible and attracts the attention of prospective passengers in the day time in the same manner that the passengers are attracted at night by the dome light. The semaphore signal is electrically connected with the taxi meter so as to operate only when the taxi meter is off. Provision is also made for seelctively disconnecting both the dome light and the semaphore signal as when the taxi is being driven but is not seeking passengers.

The drawings illustrate the upper portion of a body of the taxi 1 having a translucent dome 2 mounted on the roof. A conventional taxi meter is indicated at 3 and the meter is provided with the usual on-off lever or flag 4. Mounted inside of the dome 2 are two electric lights 5, the number of lights being relatively unimportant so long as sufficient light is available to illuminate the dome 2. The dome may be provided with a variety of shapes and configurations to identify different taxi companies.

When the semaphore signal is added to the dome signal according to the present invention the dome 2 is provided with a shaft 6 projecting through the rear wall 7. The shaft is supported in a suitable bracket 8 mounted inside the dome 2. The semaphore signal arm 9 is mounted on the rear outer end of the shaft to oscillate across the rear wall 7 and a crank arm 10 is connected to the inner end of the shaft 6. A suitable electric motor 11 and reducing gear 12 are mounted within the dome 2 and provided with a crank 13 that is connected to the crank arm 10 by the link 14. The motor 11 is conveniently of the windshield wiper motor type and incorporates a self operated switch (not illustrated) for returning the motor and in this case the semaphore arm to the same starting position regardless of the position the arm may be in when the motor is turned off.

The circuit for energizing the motor and lamps includes battery 16 connected through a control switch 17 to a switch 18 that opens when the flag 4 is down and closes when the flag is raised indicating that the cab is for hire. A wire 19 leads from the switch 17 to the motor to energize the automatic return function of the motor so that the semaphore always returns to down position when turned off.

From the flag switch 18 the circuit is carried by the wire 20 to a solenoid switch 21 that closes alternatively on conductors 22 and 23. In the deenergized condition of the coil 24 the switch 21 closes on the conductor 22 extending to the motor 11. The motor has a ground return circuit indicated at 25. When the coil 24 is energized the switch 21 closes on the conductor 23 that energizes the lamps 5.

The coil 24 that actuates the solenoid switch 21 is connected at 26 to the circuit 27 that energizes the vehicle road lights indicated at 28. Thus when it is dark enough to require road lights and the driver closes the light switch 29 the coil 24 is automatically energized to move the switch 21 from the conductor 22 to the conductor 23. The semaphore that forms the daytime for hire signal is thus turned off and returns to inoperative positive while the lamps 5 constituting the nighttime for hire signal are turned on with the road lights of the vehicle and vice versa.

Having thus described the invention what is claimed to be new and what is desired to be secured by Letters Patent is:

1. In combination with a taxi cab having road lights and a meter with an on-off lever and a light enclosed in a translucent dome on top of the cab, a device for indicating the empty and for hire condition of the taxi comprising a shaft extending through the back wall of said dome and having a signal arm on its outer end, a motor within said dome connected to oscillate said shaft and arm, a main power circuit having in series a manual switch and a switch closed by said lever in the for hire position of the lever and a solenoid operated switch, branch power circuits connectable in series with said lever switch to be energized alternatively from said solenoid switch and connected separately to said light and said motor, a road light circuit including a control switch for energizing the road lights of the taxi, and a solenoid coil positioned to actuate said solenoid switch and electrically connected to said road light circuit to be energized with the road lights.

2. In combination with a taxi cab having road lights and a meter with an on-off lever and a light enclosed in a translucent dome on top of the cab, a device for indicating the empty and for hire condition of the taxi comprising a shaft extending through the back wall of said dome and having a signal arm on its outer end, a motor within said dome connected to oscillate said shaft and arm, a main power circuit having a switch closed by said lever in the for hire position of the lever and a solenoid operated switch, branch power circuits connectable in series with said lever switch to be energized alternatively from said solenoid switch and connected separately to said light and said motor, a road light circuit for energizing the road lights of the taxi, and a solenoid coil positioned to actuate said solenoid switch and electrically connected to said road light circuit to be energized with the road lights.

3. In combination with a taxi cab having road lights and a light enclosed in a translucent dome on top of the cab, a device for indicating the empty and for hire condition of the taxi comprising a signal arm swingably mounted on said dome, a motor within said dome connected to oscillate said arm, a main power circuit having a control switch and a solenoid operated switch alternatively closable on two contacts, branch power circuits connectable in series with said main power circuit to be energized from said contacts and connected separately to said light and said motor, a circuit connectable to energize said road lights, and a solenoid coil arranged to actuate said solenoid switch and electrically connected to said road light circuit to be energized therewith.

References Cited in the file of this patent

UNITED STATES PATENTS 1,763,821   Roesen _____ June 17, 1930

FOREIGN PATENTS 1,018,335   France _____ Oct. 15, 1952